United States Patent
Alfier et al.

(10) Patent No.: US 10,560,994 B2
(45) Date of Patent: Feb. 11, 2020

(54) LIGHTING CONTROL APPARATUS, CORRESPONDING METHOD AND COMPUTER PROGRAM PRODUCT

(71) Applicants: OSRAM GmbH, Munich (DE); CLAY PAKY S.p.A., Seriate (IT)

(72) Inventors: Alberto Alfier, Vedelago (IT); Simone Capeleto, Padua (IT); Andrea Morra, Padua (IT)

(73) Assignees: OSRAM GMBH, Munich (DE); CLAY PAKY S.P.A., Seriate (IT)

( * ) Notice: Subject to any disclaimer, the term of this patent is extended or adjusted under 35 U.S.C. 154(b) by 2 days.

(21) Appl. No.: 16/203,629

(22) Filed: Nov. 29, 2018

(65) Prior Publication Data
US 2019/0166670 A1    May 30, 2019

(30) Foreign Application Priority Data
Nov. 30, 2017   (IT) .................. 102017000138491

(51) Int. Cl.
*H05B 33/08*   (2006.01)
*G06N 20/20*   (2019.01)
(Continued)

(52) U.S. Cl.
CPC ......... *H05B 33/0851* (2013.01); *G06N 20/20* (2019.01); *G11B 27/031* (2013.01); *H05B 37/0272* (2013.01)

(58) Field of Classification Search
CPC .. G11B 27/031; H05B 33/08; H05B 33/0842; H05B 33/0851; H05B 37/02; G06N 20/20
See application file for complete search history.

(56) References Cited

U.S. PATENT DOCUMENTS

2005/0046584 A1* 3/2005 Breed ............... B60C 11/24
                                                    340/13.31
2013/0015774 A1* 1/2013 Briggs ............ H05B 33/0815
                                                    315/186

FOREIGN PATENT DOCUMENTS

EP    3217769 A1    9/2017
WO    2014181369 A1    11/2014

OTHER PUBLICATIONS

Italian Search Report based on application No. 102017000138491 (7 pages) dated Aug. 1, 2018 (for reference purpose only).
(Continued)

*Primary Examiner* — Jimmy T Vu
(74) *Attorney, Agent, or Firm* — Viering Jentschura & Partner MBB

(57) ABSTRACT

A lighting control apparatus for producing control signals or cues for controlling operating parameter of one or more controlled lighting devices, including a learning machine configured for performing: a supervised learning phase, wherein, as a function of a first set of audio and/or video files coupled with a first set of control signals, the machine produces mapping rules between the audio and/or video files and the control signals of these first sets; an unsupervised learning phase wherein the machine receives a second set of audio and/or video files and produces, from the second set of audio and/or video files, a second set of control signals as a function of the mapping rules. The learning machine may be configured to carry out a reinforced learning phase with the production of an evaluation ranking of the mapping rules and the possible elimination of mapping rules.

14 Claims, 3 Drawing Sheets

(51) Int. Cl.
*H05B 37/02* (2006.01)
*G11B 27/031* (2006.01)

(56) References Cited

OTHER PUBLICATIONS

C. Katsimerou et al.; Predicting Mood from Punctual Emotion Annotations on Videos; IEEE Transactions on affective computing; vol. 6; No. 2; Apr. 30, 2015; pp. 179-192.

\* cited by examiner

LIGHTING CONTROL APPARATUS, CORRESPONDING METHOD AND COMPUTER PROGRAM PRODUCT

CROSS-REFERENCE TO RELATED APPLICATION

This application claims priority to Italian Patent Application Serial No. 102017000138491, which was filed Nov. 30, 2017, and is incorporated herein by reference in its entirety and for all purposes.

TECHNICAL FIELD

The present description refers to lighting devices.

One or more embodiments may be applied for controlling lighting in various contexts, for example, in the entertainment sector.

BACKGROUND

Professional lighting applications (e.g. in the entertainment sector, for uses such as the lighting of theaters, cinemas, stages or discotheques) and the definable uses, with reference to lighting, such as semi-professional uses (e.g. hotels, restaurants, conference rooms, etc.) or non-professional uses (for example, some domestic applications or small meeting rooms), may have particular application needs, not found in lighting applications of the current type.

For example, it is possible to envisage that a lighting device or fixture is controlled by means of commands (called "cues") intended to define its operating settings, e.g. regarding parameters such as color, brightness level or dimming, use of screens known as "gobo", application frequency of stroboscopic effects, orientation or pan-tilt, etc.

These effects and related controls are developed by light designers and tested before use, e.g. before a show, with a time-consuming activity, which may take months; during the show, the aforesaid lighting controls are transferred to the devices installed at the event location.

The times and costs associated with these activities, and the related requirements in terms of technical knowledge, are acceptable for professional shows but may be difficult to comply with for applications intended for the consumer market, either for cost reasons or due to the amateur profile of the final users.

Solutions adopted to meet these non-professional needs (e.g. domestic environments, private parties, small entertainment venues, disc-jockey activities, minor local festivals) are mainly of two types:

use of predefined commands or cues, in particular with regard to controlled lighting parameters, pre-deterministic sound-light settings, with an algorithm able to define lighting commands related to the occurrence of an event or a sequence of audio and/or video events.

Three possible examples related to this second solution may be:

sound sequences→light synchronized with the music, with the lighting device(s) synchronized with the sound: synchronization may be implemented, for example, by processing the audio signal;

video sequences→light synchronized with the video signal, with the lighting device(s) synchronized with the video signal: synchronization may be implemented, for example, by processing the video signal (e.g. via HDMI signal);

sound+video sequences→light: a combination of the two previous cases.

Documents such as, for example, EP 3 217 769 A describe techniques for controlling at least one operating parameter of lighting sources according to at least one lighting sequence, as a function of a set of temporal encoding data coupled to the sequence.

A limitation of these solutions, which cannot count on the experience of the light designer, with his "human touch", may be seen in the absence of artistic connotation. These are solutions based on a pre-deterministic approach that, by its nature, may only take into account a limited amount of sound and video combinations.

It is therefore desirable to have additional improved solutions.

SUMMARY

One or more non-limiting embodiments aim to contribute to providing such a solution.

According to one or more non-limiting embodiments, this object may be achieved due to an apparatus having the characteristics referred to in the description and claims.

One or more non-limiting embodiments may concern a corresponding method, as well as a corresponding computer program product that may be loaded into the memory (transitory or non-transitory) of at least one processing device, and comprising software code portions for carrying out the steps of the method when the product is runs on at least one computer. As used herein, the reference to this computer program product is intended to be equivalent to the reference to computer-readable means, containing instructions for controlling the processing system in order to coordinate the implementation of the method according to the invention. The reference to "at least one processing device" highlights the possibility that one or more embodiments are implemented in a modular and/or distributed form.

The claims form an integral part of the technical description provided here in relation to the embodiments.

One or more embodiments may implement a procedure based on a machine learning approach, with the ability to learn how to simulate a lighting design activity (at the level of generation of signals or command cues), for example, for non-professional applications of the type exemplified above, avoiding explicit programming.

One or more embodiments may contribute to giving the end user the impression that the light signals are based on non-pre-deterministic criteria.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various non-limiting embodiments of the invention are described with reference to the following drawings, in which.

DETAILED DESCRIPTION

Figure 1:
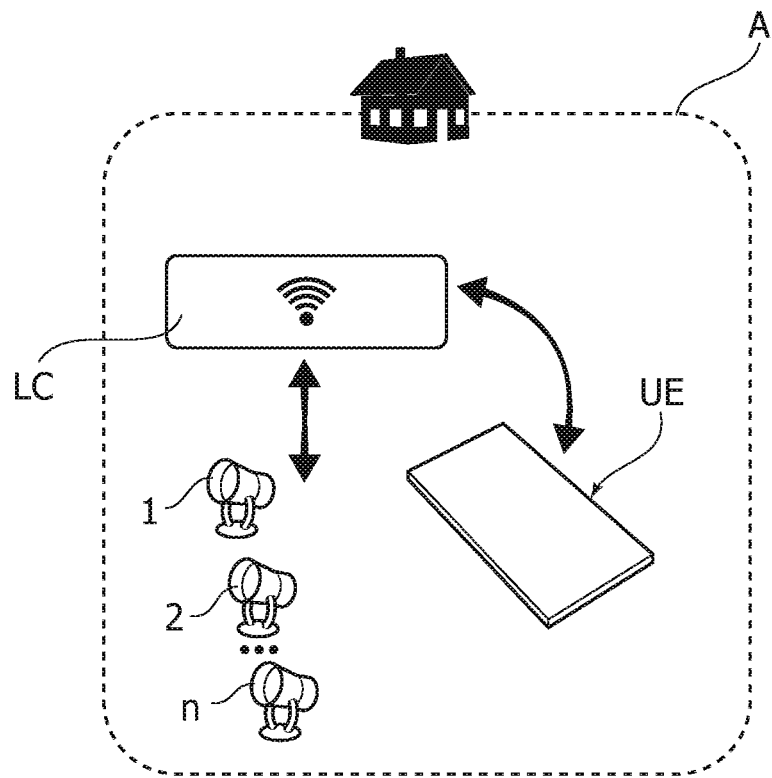
FIG. 1 is a general block diagram of a system comprising an apparatus according to embodiments.

The following description illustrates various specific details in order to provide a thorough understanding of various embodiment examples. The embodiments may be obtained without one or more of the specific details, or with other methods, components, materials, etc. In other cases, known structures materials or operations are not illustrated or described in detail so that the various aspects of the embodiments and not rendered unclear.

The reference to "an embodiment" in the context of the present description indicates that a particular configuration, structure or characteristic described in relation to the embodiment is included in at least one embodiment. Thus, sentences such as "in an embodiment", which may be present at various points in the present description, do not necessarily refer to exactly the same embodiment. Moreover, particular configurations, structures or characteristics may be combined in any suitable way in one or more embodiments.

The references used here are provided simply for convenience and therefore do not define the field of protection or scope of the embodiments.

One or more embodiments may be used in a lighting application substantially attributable to a general scheme of the type described in EP 3 217 769 A.

In this diagram (see FIG. 1), the references 1, 2, . . . , n indicate one or more lighting devices, which can be the same or different from each other and which may be installed in one or more environments, for example an environment A.

The lighting device(s) 1, 2, . . . , n (of a type to be considered known per se) may comprise electrically-powered light radiation generators, for example, solid state light radiation generators such as LED generators.

As used here, the term "environment" is understood in its broadest sense, including, among others, both a closed space, such as a domestic environment (e.g. an apartment where there is a private party), a small entertainment room, or the like, or an open space, e.g. a space where there is a disc-jockey activity, a local festival, etc. takes place), the environment being intended to be illuminated by the device(s) 1, 2, . . . , n, which may be present in any number.

It will also be assumed that, in one or more embodiments, the device or devices (which may also be implemented with different technologies and/or to also include lighting sources of screens or displays of stationary and mobile equipment, virtual/augmented reality visors), etc.) have at least one operating parameter which may be selectively controlled as a function of control signals or, according to a current designation, "cues".

These operating parameters may have a very wide range: for example (the examples cited are obviously not to be understood in a limiting sense of the embodiments):

level of light intensity (controllable not only in the on/off switching direction, but also at the level of selective intensity adjustment or "dimming";

chromatic characteristics of the emitted light radiation, orientation, intended both as a choice of a certain orientation in space, and in a dynamic sense, such as speed, width and/or path of a lighting beam moved in space, focusing, zooming.

However, it will be appreciated that, more than the content of the commands (i.e. the result they pursue and/or the methods of implementation of the commands themselves), one or more embodiments may mainly concern the methods adopted for generating these commands or cues, regardless of the content of the commands.

As far as it is concerned here, it may be assumed that, for one or more of the lighting devices 1, 2, . . . , n, it is possible to identify at least one operating parameter which may be controlled according to a given command or cue.

This control action may be performed by means of a lighting control apparatus or controller LC—known per se, also for the specific application for controlling the lights—capable of controlling the device(s) 1, 2, . . . , n by applying the same commands or cues of the lights.

This operation mode does not, however, require a local location of the light controller or LC.

In one or more embodiments, the controller LC may, at least in part, be placed in a remote position, being able to communicate remotely with the device(s) 1, 2, . . . , n via any suitable channel (wired or wireless).

In one or more embodiments, the controller LC may instead be incorporated into one of the lighting device(s) 1, 2, . . . , n.

FIG. 1 also illustrates another fixed or mobile device UE (for example, it may be a personal computer, tablet, smart phone or the like), capable of carrying out various tasks, such as, for example:

delivering content files to the controller LC (for example, an audio and/or video stream) with which, by operating according to the criteria discussed below, the controller may associate control signals or cues of the lights, intended to control the operation of the devices 1, 2, . . . , n, and/or sending user feedback signals to the controller LC, intended for use in the enhanced learning phase, as described below, and/or functioning, e.g. via a screen or display, as a lighting device itself, according to commands or cues received from the controller LC.

This exemplification is not, of course, intended to be exhaustive or binding, since one or more embodiments may envisage, e.g. the performance of these functions assigned to different devices, also regarding their nature and location, and/or the performance of different functions in addition to, or alternatively to those illustrated above.

The representation of FIG. 1 essentially concerns a possible functional organization of the system, largely disregarding the choice of components and their location.

In one or more embodiments, the controller LC (shown in FIG. 1 as a separate entity for the sake of illustrative simplicity) may be configured (e.g. according to the criteria exemplified below) in order to respond (e.g., in real time) when audio/video events occur, based on a learning process in progress, with the possibility of making sure that a certain lighting device may respond to certain audio/video events, even in a different way, during the life of the apparatus, thus adopting an approach similar to a creative (so to speak, "artistic") and non-deterministic approach.

Figure 2:
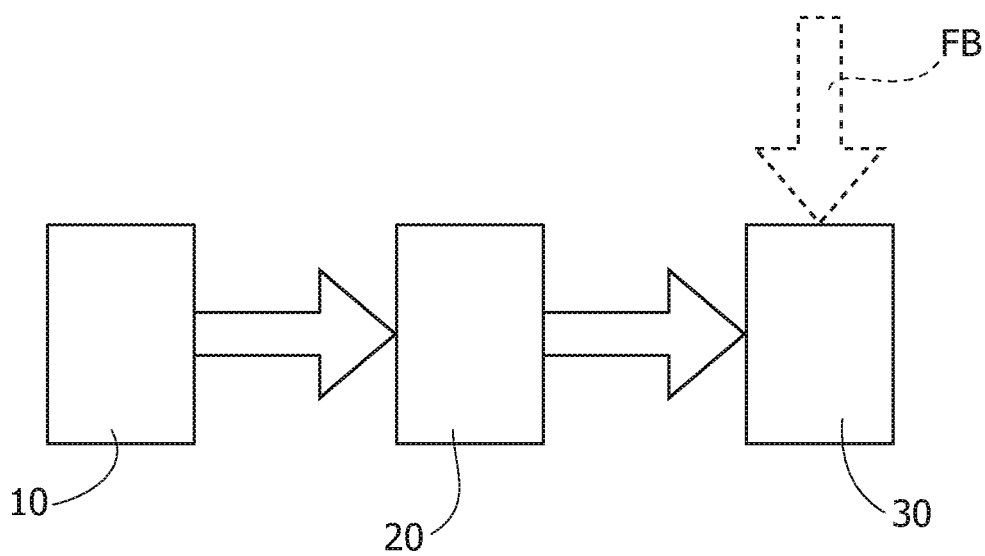
FIGS. 2 and 3 are functional block diagrams representative of the operation of an apparatus according to embodiments, FIG. 4 exemplifies, in the form of a flow chart, possible operating criteria of an apparatus according to embodiments, FIG. 5 exemplifies the possibility of producing an apparatus according to embodiments using a finite state machine (FSM), and FIG. 6 exemplifies the possibility of producing an apparatus according to embodiments by applying a convolutional neural network circuit in conjunction with a long- and short-term memory.

In one or more embodiments, these operating modes, which may be implemented at the controller LC level, may pass through three main steps, as exemplified in FIG. 2:

10: supervised learning, e.g. with a procedure implemented through an initial database of audio/video files (inputs) with lighting controls or cues (outputs) created by light designers, finding general rules that create the mapping between the inputs and the outputs;

20: unsupervised learning, with new audio/video data (inputs) so that the procedure finds its own lighting cues (outputs), based on the rules defined in phase 10;

30: enhanced or consolidated learning, with the procedure applied to events-product (with an event given by multimedia files in combination with the devices) and possible feedback FB from end users that reinforces the mapping rules of the procedures, promoting those that are considered valid, and giving less weight (if not entirely eliminating) to those that are considered invalid, with a mechanism that may be defined as a mechanism of reward and punishment.

One or more embodiments may, therefore, integrate the development function of machine learning algorithms with the role of the light designer or director, with the possible interaction with other professional profiles, for example, at the level of hardware device development or customer assistance.

As an example (deliberately simplified for ease of understanding), we may consider the case of multimedia contents related to sports events such as athletic events.

Sequences may be considered, still by way of example, in which running phases and jumping phases alternate, such as a high jump test, in which an athlete prepares for the jump, running towards the obstacle, which is then jumped, or an obstacle course race, in which the athletes run between one obstacle and another, jumping them in sequence.

Direction of the lights in a creative sense (for simplicity, the possible presence of audio content will not be taken into account, so that the explanation is not too complex) may envisage, even in the analogy of the run-jump alternation, associating different commands or cues with the two sequences, e.g.:

lighting with increasing intensity associated with the accelerating run of the high jumper, followed by a stroboscopic effect at the moment of the jump, and lighting with a rhythmically variable intensity associated with the substantially constant run of the distance runner, interspersed with more intense lighting phases ("strokes" of light) when the athlete jumps obstacles.

In the supervised learning phase 10, on the basis of a corresponding input deducted e.g. from a database that collects the indications of a creative lighting direction of the exemplified type, the controller LC, configured as a learning machine may, therefore, produce mapping rules between the audio and/or video files (run-jump) and the relative control signals or cues set by a creative lighting director (e.g. by a human operator).

Subsequently, still continuing with the simplified example proposed here, the controller LC may receive, e.g. from the device UE, "new"-type video files (also here, for simplicity, the possible presence of audio content will not be taken into account, so that the explanation is not too complex), i.e. not included among those analyzed previously, including files alternating between running and a quick action like a jump, e.g. a pole vault sequence, a javelin throw sequence or a triple jump sequence.

In the unsupervised learning phase 20, the controller LC, configured as a learning machine, may then receive this new set of audio and/or video files and produce a set of control signals or cues for the lights, starting from the new set of audio and/or video files, using the mapping rules developed in the supervised learning phase 10.

For example, the high jump commands or cues may be used for the pole vault (even if the controller has not been specifically instructed about it in step 10).

This may also apply to the javelin launch or the triple jump, with the possibility (for example, if the probabilistic approach discussed below with regard to a possible implementation of the learning machine as a finite state machine or FSM), of applying a certain mapping rule to the "new" files or events chosen from the mapping rules developed in the supervised learning phase 10.

This way of working may lead to more or less satisfactory results.

Still continuing in the simplified example introduced here, in the case of the triple jump, preceded by an accelerating run (with increasing intensity lighting), a stroboscopic effect at the time of the jump may be less satisfying than the possibility of associating each of the three successive jumps with respectively more intense lighting phases ("strokes" of light).

In one or more embodiments, in the enhanced learning phase 30, the controller LC—configured as a learning machine—may produce an evaluation ranking of the mapping rules, for example, as a function of feedback signals from the user.

In one or more embodiments, these user feedback signals may include evaluation signals supplied to the machine by a user (e.g. by means of the device UE) and/or frequency signals of usage or utilization, detected by the controller LC, and indicative of the selection frequency of certain audio and/or video files coupled with respective control signals.

In one or more embodiments, the controller LC may be configured to give less weight to (or eliminate altogether) the mapping rules that occupy tail positions in the evaluation ranking (which sees the "promoted" rules at the top, and rules "rejected" by users at the bottom).

Figure 3:
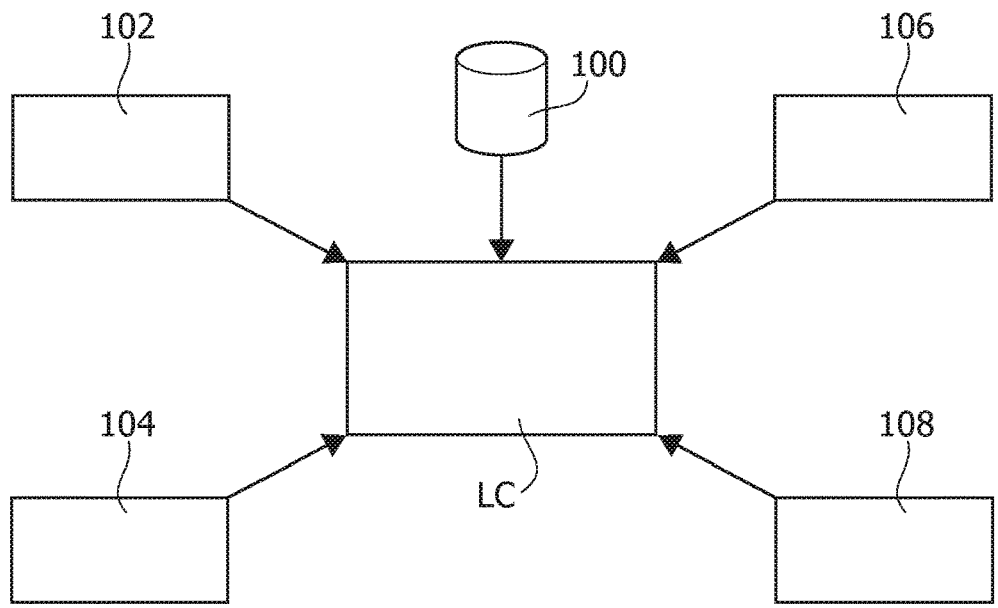

FIG. 3 is a functional diagram related to the development of a method of proceeding as outlined above.

In one or more embodiments, a learning procedure of the type outlined above may be based on the following elements:

100: database of multimedia files
102: multimedia categories
104: characteristics of audio/video files
106: scenario
108: scenario effects.

In one or more embodiments, these elements may be defined at the beginning, representing the starting point for a learning algorithm during the supervised learning phase 10. In the later phases, these elements evolve as the procedure continues to "learn".

Moving on to examine more closely the elements introduced previously, one or more embodiments may use a machine learning algorithm, implemented e.g. in the controller LC, based on a set of multimedia files within a database 100, with multimedia files accessible to the algorithm grouped into categories 102.

In this way, it is possible to reduce the combinations that the algorithm has to manage, simplifying—at the beginning—the supervised learning phase 10 and facilitating—in the successive phases—the association of light signals with the events: to give just one example (obviously not limitative), in a horror film, the music may be dominant in defining the control signals or cues of the lights, while the video component may count more in a sporting event.

Examples of categories 102 usable in one or more embodiments may include:

type of multimedia content: films, documentaries, music clips, concerts in streaming, live concerts, etc. . . .

first-order sub-types: in the case of films, e.g. detective stories, horror, comedy, animation, etc. . . .

second-order sub-types (more in-depth): fairy tales-animated-films, manga-animated-films, nature-animated-films.

Figure 4:
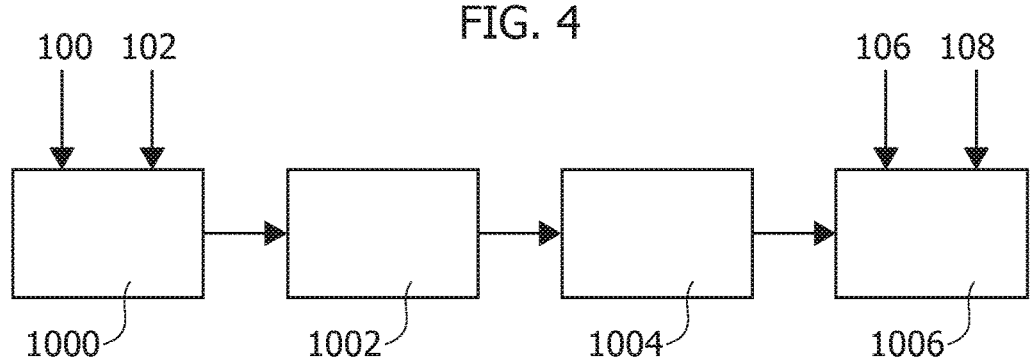

In one or more embodiments, as exemplified by block 1000 in the flowchart of FIG. 4, for each combination of categories and sub-categories 102, it is possible to select, starting from the set of multimedia files of the database 100, a minimum set of different multimedia files. The higher the number, the greater the ability to be developed by the procedure in simulating the activity of a light designer.

In one or more embodiments, as exemplified by the block 1002, the audio and video signals in the selected multimedia files may be analyzed in order to obtain audio and video (quantitative) parameters to be used as inputs for the learning algorithm.

For example, the audio and video components may be analyzed on a frame-by-frame basis, with a cadence or frame rate that may be defined by the end user.

It is thus possible to obtain a sequence of characteristics (features), for each time frame of the multimedia file, indicated by 1004 in FIG. 4.

For example, the aforesaid characteristics may be based (according to analysis criteria known per se) on a parameter or on a combination of several parameters corresponding to:
signal pixeling (e.g. subdivision of the image into rows and columns, with analysis of each pixel);
analysis of the brightness and colors;
recognition of a facial configuration; template;
analysis of the movement of configurations or patterns (e.g. polygonal);
analysis of a rhythmic base;
sound analysis, e.g. at the level of sonority, intensity, timbre;
distinction between sound, voices, noise;
dynamics of the intensity of the sound, or rather acute/serious sound);
combination of video and sound analysis (e.g. color and dynamics of the intensity);
parameters related to the analysis of an environment;
parameters related to the analysis of an action/activity;
parameters related to the analysis of a situation/behavior.

The parameters indicated above are only possible examples, since, in one or more embodiments, it is possible to choose other parameters.

In one or more embodiments, a scenario catalogue 106 may be defined as a combination of elements such as, e.g.
audio features, obtained by means of audio analysis;
video features, obtained by means of video analysis;
duration of an audio/video combination;
category of multimedia files.

In one or more embodiments, during supervised learning (step 10 in FIG. 2), to create initial scenarios, it is possible to adopt a clustering algorithm (block 1006 of FIG. 4). This may be any known clustering algorithm able to aggregate homogeneous data starting from possible combinations (virtually all) of the previous elements.

In one or more embodiments, the number of scenarios is therefore not pre-determined, being linked to the output of the clustering algorithm. This way of operating allows the control and possible modification by an operator.

In one or more embodiments, in the subsequent phase(s) (e.g., 20 and 30 in FIG. 2), the procedure may then learn from experience whether and what scenarios to promote, i.e. which to prefer over others.

The scenario effects 108 are (all) the possible lighting effects defined for a specific scenario.

In the supervised learning 10, developers may associate effects (by defining corresponding cues of the lights) to a certain specific scenario, with the possibility of associating different effects with a single scenario.

In the successive phases (for example, 20 and 30 in FIG. 2) the procedure learns from experience (i.e. following the sequence of events and effects), creating a ranking of what scenario-effect pairings to promote, that is to say, which have preference over others.

For a certain multimedia file that falls within a specific scenario, for each time frame, the procedure "learns" to select the effects from this list.

Figure 5:
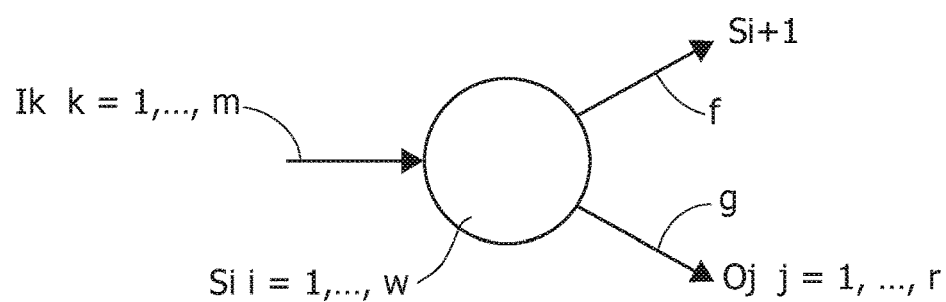

In one or more embodiments, as exemplified in FIG. 5, the learning algorithm outlined above may be implemented as a finite state machine (FSM), wherein:
finite state—S={S1, S2, ..., Sw}: scenario state
input values—I={I1, I2, ..., Im}: audio/video characteristics of a specific scenario
output values—O={O1, O2, ..., Or}: luminous effect.

At a certain moment of time t, a transmission function f associates an input state S (t) with a subsequent state S (t+1), given a given input value I (t), i.e.:

$$S(t+1)=f(S(t),I(t))$$

according to a certain probability P that the event S(t+1) is subsequent to S(t), which may be expressed as:

$$P(t+1,t)=p(S(t+1),S(t)).$$

At a certain time instant t, a transmission function g associates an input state S(t) with an output state O(t), given a certain input value I(t).

$$O(t)=g(S(t),I(t)).$$

Below are some examples of possible implementation criteria of the learning phases 10, 20 and 30 at the apparatus (controller) LC level (without limiting intent).

Supervised Learning Phase 10

The first phase of the procedure involves learning the effects-scenario catalogue 108, i.e. correspondence of the lighting effects for each defined audio/video scenario, independently of the evolution of the finite state (i.e. without time dependence).

This way of working may be defined as a set of functions:

$$S(t+1)=f(S(t),I(t))=S(t)=S0 \text{ (unchanged state)}$$

$$P(t+1,t)=p(S(t+1),S(t))=1 \text{ (probability=1)}$$

$$O(t)=g(S(t),I(t))=g(I(t)) \text{ (fixed output)}.$$

The lighting effects settings only depend on the audio/video input functions.

Unsupervised Learning Phase 20

In this learning phase, no labels are supplied to the learning algorithm, leaving it the task of finding a structure in its input.

Unsupervised learning may be a goal in itself (aiming to discover hidden patterns in the data) or a step towards a purpose (learning of the functionalities).

The algorithm learns to analyze its history according to three relations:

$$S(t+1)=f(S(t),I(t))$$

$$P(t+1,t)=p(S(t+1),S(t))$$

$$O(t)=g(S(t),I(t)).$$

The emission function is then used to correlate the output (light effects) with a sequence of N preceding light output effects [O(t−1), ..., O (tN)] and a sequence of M preceding inputs (audio/video characteristics) [I (t−1), ..., I (tM)].

Reinforced Learning Phase 30

The procedure may be tested by end users (see e.g. FB in FIG. 2) with their feedback used to associate a "reward" or "punishment" with a transition or series of transitions, operating in the direction of a promotion or of a rejection.

For example, this may involve increasing or decreasing the likelihood that the same transition or transition set will occur in the future, respectively.

Feedback from users may be implemented by different means such as, for example:

active feedback by the end user: e.g. the end user may, by acting on the controller LC (e.g. via a mobile terminal, of any known type, such as a smartphone or the like), to vote in favor of a multimedia file with a certain set of commands or cues for the lights, defined by the procedure;

passive feedback by the end user: this action may be implemented by monitoring, e.g. at the controller LC level, the frequency of selecting a multimedia file with a certain set of commands or cues for the lights defined by the procedure.

In one or more embodiments, feedback may be represented by another generic feedback by the end user or other computer program able to participate in the machine learning process, including the feedback provided by another artificial intelligence system (A.I.), capable of facilitating "humanization" of the generation of cues.

In this context, the term "end user" generally indicates a subject capable of benefiting and evaluating the results of the procedure: as far as it is concerned here, the end user may be both those who benefit in the proper sense of the multimedia content (e.g. at the entertainment level), either a light designer, or an art director, or a producer or the like, subjects who are given the task of "refining" the learning mechanisms of the system.

Figure 6:
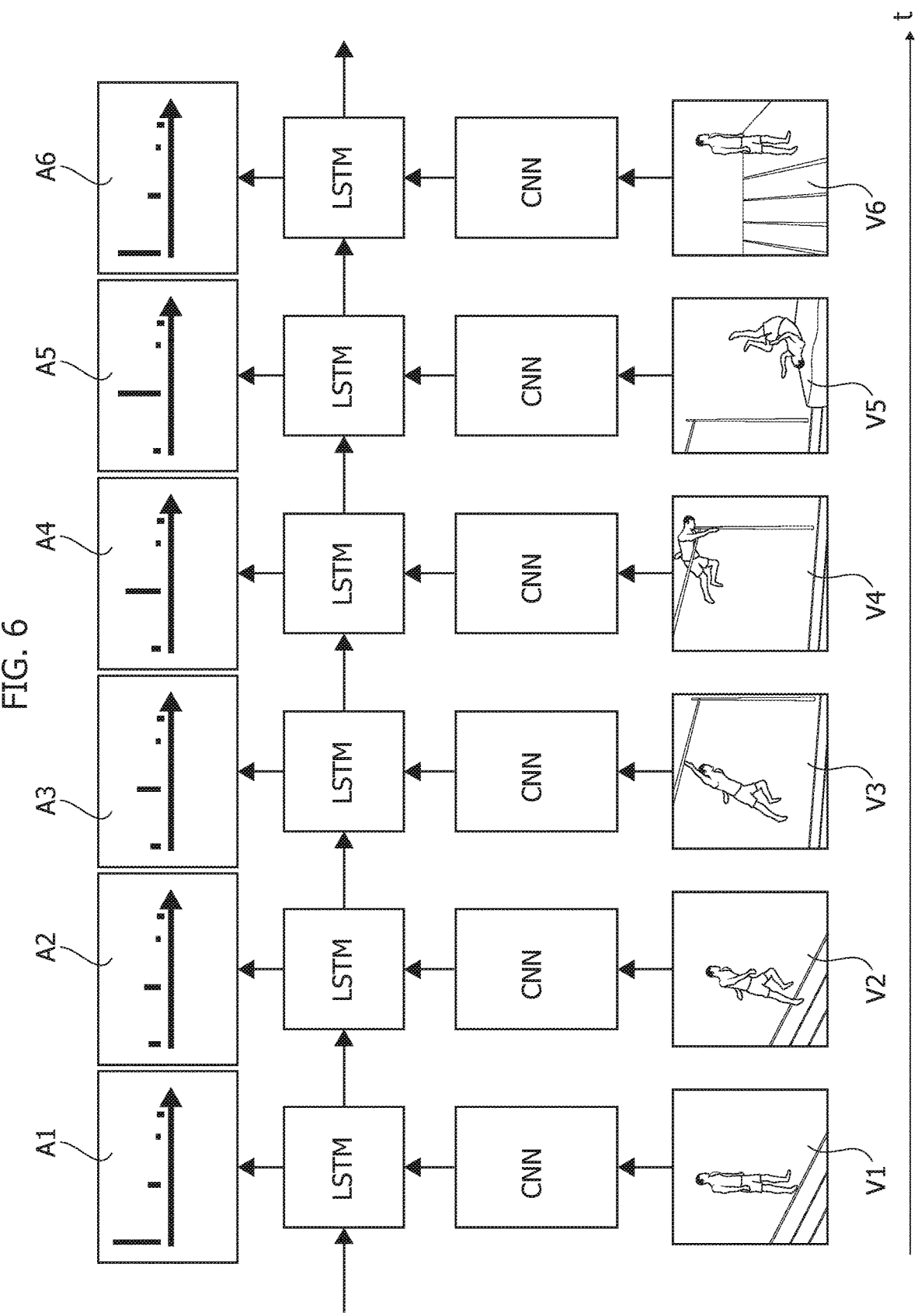

FIG. 6 presents, for example, a way to implement a finite state machine (FSM), so as to envisage an approach based on an artificial "deep" neural network (DNN) with events modeled with a combination of a convolutional neural network (CNN) and a long- and short-term memory or LSTM.

CNN networks are a tool already used at the feed-forward level in artificial neural networks for recognizing sounds and images.

LSTM memories may operate as memories of a machine able to learn (learning machine) on both long- and short-term intervals and may be included in the category of recurrent neural networks (RNN).

Of course, this view is purely exemplary, since one or more embodiments may be implemented with machines of different types.

The diagram in FIG. 6, representative of a possible evolution over time (temporal x-axis t), exemplifies how each image (frame) in a video sequence—presented here as an intentionally simplified example—as a sequence of six images V1, V2, V3, V4, V5, V6—relative (again by way of example) to how an athlete who jumps an obstacle may be analyzed, for example, with the CNN and LSTM tools described above.

It is thus possible to provide an indication of the occurrence of a certain event (e.g. preparation for jumping, real jump). This operation mode is exemplified in the boxes A1, A2, A3, A4, A5, A6 above, respectively corresponding to the images or frames V1, V2, V3, V4, V5, V6, with, for example:

the probability of the "jump preparation" event (left in the box) that prevails in the box A1 corresponding to the image V1 where, effectively, the athlete is preparing to jump;

the probability of the "real jump" event, (in the middle of the box, very small in the box A1, which grows and becomes prevalent in boxes A2, A3, A4, A5 corresponding to the images V2, V3, V4, V5, where we see the jumping athlete getting ready to jump, while the probability of the "jump preparation" event becomes—in itself—negligible;

the situation in box A1, which is restored in box A6 at image V6 where it may be seen that, after the jump, the same athlete or another athlete is preparing for a new jump action.

With reference to the diagram in FIG. 6:

in the supervised learning phase 10, the CNN is trained to "learn" the output related to the scenario, in the unsupervised 20 and reinforced 30 learning phases, the memory LSTM learns how the scenario may evolve based on the defined mapping rules and user feedback.

Once the procedure is being implemented (e.g. in phase 30) it is possible to generate—automatically—and send controls or cues to the lighting devices 1, 2, . . . , n of the lights that mimic—in a likely way—the activity of a light designer.

This may happen both in a non-professional context, as illustrated in the introduction to the present description, such as in professional applications, or in applications not strictly related to real events, e.g. in the field of equipment used for electronic games.

The above description and the annexed figures refer, for simplicity, to possible implementations with LC and UE devices of a "local" nature, with the described procedure assumed to be carried out in an environment of use.

It will be appreciated that, in one or more embodiments, devices such as LC or UE devices may operate as gateways to the world wide web (e.g. at the Cloud level), with the learning procedure with all the relative clusters (light cues, scenarios, associated probabilities, . . . ) and the database of events to be followed in streaming or broadcasting which reside in a remote server accessible via the web (via LAN, wireless, or via a data network by a telephone operator), e.g. according to criteria as exemplified in documents such as EP 3 217 769 A1, previously cited.

One or more embodiments may, therefore, be oriented both to domestic applications and to professional applications.

In a domestic environment, the user may have an intelligent automated system integrated remotely and accessible via the web.

In the case of professional use, the light designer may provide the relevant software, for example, at the license level, with the possibility of local and/or remote management, with learning abilities based on personal experience.

In one or more embodiments, a lighting control apparatus (e.g., LC) for producing control signals (or cues) of at least one operating parameter of at least one controlled lighting device (e.g., 1, 2, . . . , n) may include a learning machine configured to perform:

a supervised learning phase (e.g. 10), wherein, as a function of a first set of audio and/or video files coupled with a first set of control signals (as received, for example, from the database 100 of FIG. 3), the machine produces mapping rules between the first set of audio and/or video files and the first set of control signals;

an unsupervised learning phase (e.g. 20) wherein the machine receives (e.g. from the UE device of FIG. 1) a second set of audio and/or video files and produces, starting from the second set of audio and/or video files, a second set of control signals as a function of the mapping rules.

In one or more embodiments, the learning machine may be configured to perform a reinforced learning phase (e.g., 30) with the production of an evaluation ranking of the mapping rules.

In one or more embodiments, the learning machine may be responsive to usage feedback signals (e.g., FB) and be configured to produce the evaluation ranking of the mapping rules as a function of the usage feedback signals.

In one or more embodiments, the learning machine may be responsive to usage feedback signals selected from:

usage evaluation signals supplied to the learning machine (e.g. by means of the UE device), and/or usage frequency signals detected by the learning machine and indicating a selection frequency of certain audio and/or video files coupled with respective control signals.

In one or more embodiments, the learning machine may be configured to eliminate mapping rules in tail positions in the evaluation ranking.

In one or more embodiments, the learning machine may be configured for producing the first set of audio and/or video files coupled with a first set of control signals via a clustering procedure (e.g. 1006) applied to combinations of audio and/or video files with control signals coupleable with the audio and/or video files.

In one or more embodiments, the learning machine may comprise a finite state machine, FSM, which concedes a plurality of machine states (for example Si), in which:

a transmission function f produces a transition from a state $S(t)$ in the plurality of machine states (Si) to a subsequent state $S(t+1)$ in the plurality of machine states (Si) as a function of an input value $I(t)$, and a transmission function g couples a state $S(t)$ in the plurality of machine states (Si) to an output value $O(t)$ as a function of a determined input value $I(t)$, wherein the input values $I(t)$ and output values $O(t)$ are indicative of audio and/or video files and control signals, respectively, linked via the mapping rules.

In one or more embodiments, the transmission function f of the finite state machine may produce a transition from a state $S(t)$ in the plurality of machine states to a subsequent state $S(t+1)$ as a function of a probability P that an event associated with the subsequent state $S(t+1)$ in the plurality of machine states occurs after the state $S(t)$ in the plurality of machine states.

In one or more embodiments, the learning machine may be configured for the transmission function f of the finite state machine for correlating, in the unsupervised learning phase, the output values $O(t)$ with a sequence of N previous output values and with a sequence of M previous input values.

In one or more embodiments, the learning machine may comprise:

an artificial neural network—that is, a circuit—(e.g. CNN) configured for learning, during the supervised learning phase, the mapping rules between the first set of audio and/or video files and the first set of control signals, and a long- and short-term memory (e.g. LSTM) configured for learning, during the unsupervised learning phase, the evolution over time of the control signals in the second set of control signals produced as a function of the mapping rules.

In one or more embodiments, the long- and short-term memory may be configured for learning, during the reinforced learning phase, the evolution over time of the control signals in the second set of control signals produced as a function of the mapping rules for which the evaluation ranking has been produced.

In one or more embodiments, a method of controlling at least one operating parameter of at least one lighting device $(1, 2, \ldots, n)$, may comprise:

providing a lighting control apparatus (LC) according to one or more embodiments, provided (for example, starting from the database 100 of FIG. 3) with a first set of audio and/or video files coupled with a first set of control signals, activating the learning machine in the system, and controlling the at least one lighting device with the control signals produced by the learning machine.

One or more embodiments may regard a computer program product, which may be loaded into the memory of the learning machine (e.g., LC) of a system according to one or more embodiments and comprising software code portions for activating the learning machine by implementing the procedure according to one or more embodiments.

Without prejudice to the underlying principles of the invention, the details of construction and the embodiments may vary, even significantly, with respect to those described here, purely by way of non-limiting example, without departing from the scope of the invention.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

LIST OF REFERENCE SIGNS

Environment A
Device UE
Control equipment LC
Lighting devices 1, 2, . . . , n
Supervised learning phase 10
Unsupervised learning phase 20
Reinforced learning phase 30
Usage feedback signals FB
Database of multimedia files 100
Multimedia categories 102
Characteristics of audio/video files 104
Scenario 106
Scenario effects 108
Selection block 1000
Analysis of selected audio and video signals 1002
Feature sequence 1004
Clustering procedure 1006
Transmission function f
Transmission function g
Machine states Si, $S(t+1)$
Output value $O(t)$
Input value $I(t)$
Boxes A1, A2, A3, A4, A5, A6
Images or frames V1, V2, V3, V4, V5, V6

What is claimed is:

1. A lighting control apparatus for producing control signals of at least one operating parameter of at least one controlled lighting device, wherein the apparatus includes a learning machine configured for performing:

a supervised learning phase, wherein, as a function of a first set of audio and/or video files coupled with a first set of control signals, the machine produces mapping rules between the first set of audio and/or video files and the first set of control signals;

an unsupervised learning phase wherein the machine receives a second set of audio and/or video files and produces, from the second set of audio and/or video files, a second set of control signals as a function of the mapping rules.

2. The lighting control apparatus of claim 1, wherein the learning machine is configured for performing a reinforced learning phase by producing an evaluation ranking of the mapping rules.

3. The lighting control apparatus of claim 2, wherein the learning machine is responsive to usage feedback signals and is configured for producing the evaluation ranking of the mapping rules as a function of the usage feedback signals.

4. The lighting control apparatus of claim 3, wherein the learning machine is responsive to usage feedback signals selected out of:
   usage evaluation signals provided to the learning machine, and
   usage frequency signals detected by the learning machine and indicating a frequency of selection of certain audio and/or video files coupled with respective control signals.

5. The lighting control apparatus of claim 2, wherein the learning machine is configured for deleting mapping rules in tail positions in the evaluation ranking.

6. The lighting control apparatus of claim 1, wherein the learning machine is configured for producing the first set of audio and/or video files coupled with a first set of control signals via a clustering procedure applied to combinations of audio and/or video file with control signals coupleable with the audio and/or video files.

7. The lighting control apparatus of claim 1, wherein the learning machine includes a finite state machine, having a plurality of machine states wherein:
   a transmission function f produces a transition from a state S(t) in the plurality of machine states to a subsequent state S(t+1) in the plurality of machine states as a function of an input value I(t), and
   a transmission function g couples a state S(t) in the plurality of machine states to an output value O(t) as a function of an input value I(t),
   wherein the input values I(t) and output values O(t) are indicative of audio and/or video files and control signals, respectively, linked via the mapping rules.

8. The lighting control apparatus of claim 7, wherein the transmission function f of the finite state machine produces a transition from a state S(t) in the plurality of machine states to a subsequent state S(t+1) as a function of a probability P that an event associated with the subsequent state S(t+1) in the plurality of machine states occurs after the state S(t) in the plurality of machine states.

9. The lighting control apparatus of claim 7, wherein the transmission function f of the finite state machine is configured for correlating, in the unsupervised learning phase, the output values O(t) with a sequence of N previous output values and with a sequence of M previous input values.

10. The lighting control apparatus of claim 1, wherein the learning machine includes:
   an artificial neural network configured for learning, during the supervised learning phase, the mapping rules between the first set of audio and/or video files and the first set of command signals, and
   a long short term memory configured for learning, during the unsupervised learning phase, the evolution over time of the control signals in the second set of control signals produced as a function of the mapping rules.

11. The lighting control apparatus of claim 10,
   wherein the learning machine is configured for performing a reinforced learning phase by producing an evaluation ranking of the mapping rules,
   wherein the long short term memory is configured for learning, during the reinforced learning phase, the evolution over time of the control signals in the second set of control signals produced as a function of the mapping rules for which the evaluation ranking has been produced.

12. A method of controlling at least one operating parameter of at least one lighting device, the method including:
   providing a lighting control apparatus, wherein the lighting control apparatus includes a learning machine configured for performing:
      a supervised learning phase, wherein, as a function of a first set of audio and/or video files coupled with a first set of control signals, the machine produces mapping rules between the first set of audio and/or video files and the first set of control signals;
      an unsupervised learning phase wherein the machine receives a second set of audio and/or video files and produces, from the second set of audio and/or video files, a second set of control signals as a function of the mapping rules;
   supplying the lighting control apparatus with a first set of audio and/or video files coupled with a first set of control signals,
   activating the learning machine in the system, and
   controlling the at least one lighting device with the control signals produced by the learning machine.

13. A non-transitory computer readable medium, loadable in a memory of a learning machine in a lighting control apparatus, wherein the learning machine is configured for performing:
   a supervised learning phase, wherein, as a function of a first set of audio and/or video files coupled with a first set of control signals, the machine produces mapping rules between the first set of audio and/or video files and the first set of control signals;
   an unsupervised learning phase wherein the machine receives a second set of audio and/or video files and produces, from the second set of audio and/or video files, a second set of control signals as a function of the mapping rules;
   the non-transitory computer readable medium including software code portions for activating the learning machine in a method of controlling at least one operating parameter of the at least one lighting device, the method including:
   providing the lighting control apparatus;
   supplying the lighting control apparatus with a first set of audio and/or video files coupled with a first set of control signals,
   activating the learning machine in the system, and
   controlling the at least one lighting device with the control signals produced by the learning machine.

14. The lighting control apparatus of claim 8, wherein the transmission function f of the finite state machine is configured for correlating, in the unsupervised learning phase, the output values O(t) with a sequence of N previous output values and with a sequence of M previous input values.

* * * * *